US010837341B2

(12) United States Patent
Balenovic et al.

(10) Patent No.: US 10,837,341 B2
(45) Date of Patent: Nov. 17, 2020

(54) EXHAUST TRACT HAVING A METERING DEVICE WHICH SPRAYS COUNTER TO A DIRECTION OF FLOW, METHOD FOR OPERATING AN EXHAUST TRACT AND VEHICLE HAVING AN EXHAUST TRACT

(71) Applicant: Ford Global Technologies, LLC, Dearborn, MI (US)

(72) Inventors: Mario Balenovic, Waalre (NL); Felix Goebel, Aachen (DE); Martina Reichert, Aachen (DE); Monika Angst, Aachen (DE); Robert Ukropec, Herzogenrath (DE); Brendan Patrick Carberry, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 598 days.

(21) Appl. No.: 15/199,121

(22) Filed: Jun. 30, 2016

(65) Prior Publication Data

US 2017/0002713 A1 Jan. 5, 2017

(30) Foreign Application Priority Data

Jul. 3, 2015 (DE) ........................ 10 2015 212 485

(51) Int. Cl.

*F01N 3/28* (2006.01)
*F01N 3/20* (2006.01)
*F01N 3/10* (2006.01)
*F01N 3/08* (2006.01)
*F01N 3/035* (2006.01)

(Continued)

(52) U.S. Cl.

CPC ........... *F01N 3/2892* (2013.01); *B01D 53/90* (2013.01); *B01D 53/9418* (2013.01);

(Continued)

(58) Field of Classification Search

None

See application file for complete search history.

(56) References Cited

U.S. PATENT DOCUMENTS 8,528,884 B2 9/2013 Maus et al.
2007/0089403 A1* 4/2007 Pfeifer .............. B01D 53/9418 60/286

(Continued)

FOREIGN PATENT DOCUMENTS

CN 101175904 A 5/2008
CN 102191975 A 9/2011

(Continued)

OTHER PUBLICATIONS

China National Intellectual Property Administration, Office Action and Search Report Issued in Application No. 201610523006.6, dated Jul. 31, 2019, 14 pages. (Submitted with Partial Translation).

*Primary Examiner* — Anita Nassiri-Motlagh

(74) *Attorney, Agent, or Firm* — Geoffrey Brumbaugh; McCoy Russell LLP

(57) ABSTRACT

Methods and systems are provided for an exhaust tract for vehicles having an internal combustion engine, the exhaust tract including a first exhaust gas aftertreatment device and a metering device arranged downstream therefrom. In one example, a region of the first exhaust gas aftertreatment device which is situated downstream is designed as an SCR region. Further, the metering device is designed to spray a reducing agent onto a side of the first exhaust gas aftertreatment device which faces the metering device, counter to a main direction of flow of an exhaust gas.

14 Claims, 3 Drawing Sheets

1
10
16
8
12
11
14
5
15
2
17
10A
21
22
3
20
23
9
13
19

(51) Int. Cl.
*B01D 53/94* (2006.01)
*B01D 53/90* (2006.01)

(52) U.S. Cl.
CPC ......... *B01D 53/9477* (2013.01); *F01N 3/035* (2013.01); *F01N 3/0814* (2013.01); *F01N 3/0842* (2013.01); *F01N 3/106* (2013.01); *F01N 3/2066* (2013.01); *B01D 53/944* (2013.01); *B01D 2251/2067* (2013.01); *B01D 2255/91* (2013.01); *F01N 2240/20* (2013.01); *F01N 2610/02* (2013.01); *F01N 2610/03* (2013.01); *Y02A 50/2325* (2018.01); *Y02T 10/24* (2013.01)

(56) References Cited

U.S. PATENT DOCUMENTS

| | | | | |
|---|---|---|---|---|
| 2008/0267780 | A1* | 10/2008 | Wirth | B01F 3/022 416/204 A |
| 2008/0302088 | A1* | 12/2008 | Koehler | F01N 3/103 60/286 |
| 2014/0161679 | A1* | 6/2014 | Chiffey | F01N 13/009 422/170 |

FOREIGN PATENT DOCUMENTS

| | | | |
|---|---|---|---|
| CN | 102213123 | A | 10/2011 |
| CN | 104234792 | A | 12/2014 |
| DE | 4342062 | A1 | 6/1994 |
| DE | 102006051788 | A1 | 5/2008 |
| DE | 102008001212 | A1 | 10/2009 |
| DE | 102008048806 | A1 | 3/2010 |
| DE | 102008063488 | A1 | 6/2010 |
| DE | 102010025880 | A1 | 1/2012 |
| DE | 102010039121 | A1 | 2/2012 |
| EP | 1712754 | A1 | 10/2006 |
| EP | 1748162 | A1 | 1/2007 |
| EP | 1890016 | A2 | 2/2008 |
| EP | 2295754 | A1 | 3/2011 |
| EP | 2386736 | A1 | 11/2011 |
| EP | 2529091 | B1 | 12/2012 |
| JP | 2006336588 | A | 12/2006 |
| WO | 03004839 | A1 | 1/2003 |
| WO | 2011089330 | A1 | 7/2011 |
| WO | 2013005292 | A1 | 1/2013 |

* cited by examiner

EXHAUST TRACT HAVING A METERING DEVICE WHICH SPRAYS COUNTER TO A DIRECTION OF FLOW, METHOD FOR OPERATING AN EXHAUST TRACT AND VEHICLE HAVING AN EXHAUST TRACT

CROSS REFERENCE TO RELATED APPLICATION

This application claims priority to German Patent Application No. 102015212485.1, filed Jul. 3, 2015, the entire contents of which are hereby incorporated by reference for all purposes.

FIELD

The present description relates generally to methods and systems for an exhaust gas aftertreatment system of an engine.

BACKGROUND/SUMMARY

The disclosure relates to an exhaust tract with exhaust gas purification for internal combustion engines, in particular vehicle internal combustion engines operated with a lean fuel mixture. During operation, internal combustion engines often generate considerable volumes of nitrogen oxides (NOx). Particularly in the case of diesel and spark-ignition engines used in motor vehicles, the nitrogen oxide volumes in the exhaust gas are generally above the permitted limits, and therefore exhaust gas aftertreatment may be required to reduce NOx emissions. In the case of many engines, the nitrogen oxides are reduced by unoxidized constituents of the exhaust gas, namely by carbon monoxide (CO) and unburned hydrocarbons (HC), with the aid of a three-way catalyst. Particularly in the case of diesel engines and engines which are operated with a lean fuel mixture, however, this method is not available since there is no or virtually no reduction of NOx owing to the high oxygen content of the exhaust gas. Particularly in the case of diesel engines, an SCR catalyst (SCR: Selective Catalytic Reaction) is therefore employed according to a widely used method, said catalyst converting the nitrogen oxides contained in the exhaust gas from the internal combustion engine into harmless substances (N2 and H2O) with the aid of a reducing agent introduced into the exhaust line. In SCR catalysts, these reactions can take place only within a certain temperature range.

The attainment of a minimum light-off temperature (TLO) of the SCR catalyst characterizes the attainment of a threshold value, which, in turn, is an indicator of the effectiveness of NOx conversion. The attainment of this threshold value is generally known as "light-off" by those skilled in the art. The threshold value of the "conversion rate" comprising an indicator of effectiveness is often a NOx conversion rate of 90%, for example. Depending on the design of the SCR catalyst, conventional "light-off" temperatures TLO are 200° C. to 250° C. Under this aspect, it makes sense to arrange the SCR catalyst in the exhaust tract as close as possible to the internal combustion engine in order to be able to reach TLO as quickly as possible. From temperatures of about 500° C., the conversion rate of SCR catalysts falls sharply, however.

The inventors herein have recognized that it is desirable to have an exhaust tract (or exhaust aftertreatment system) which provides good NOx conversion both at low exhaust gas temperatures and/or after a short warm-up time and at high exhaust gas temperatures.

In one example, an exhaust tract for vehicles having an internal combustion engine includes: a first exhaust gas aftertreatment device and a metering device arranged downstream therefrom. A first region of the first exhaust gas aftertreatment device which is situated downstream in the exhaust tract in the a main direction of flow of the exhaust gas is designed as an SCR region and the metering device is designed to spray a reducing agent onto a downstream-facing side of the first exhaust gas aftertreatment device, counter to a the main direction of flow of an the exhaust gas. In this way, It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
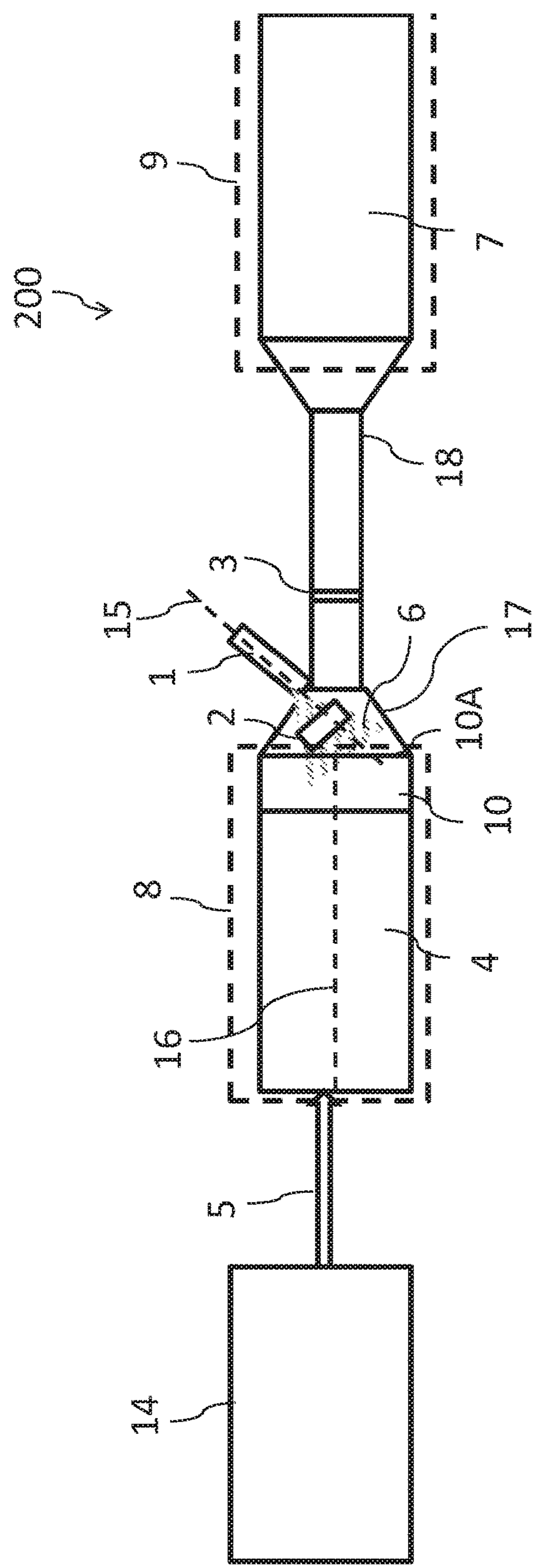
FIG. 1 shows a first illustrative exhaust tract according to an embodiment of the disclosure.

The following description relates to systems and methods for an exhaust gas aftertreatment system disposed in an exhaust tract (e.g., passage) of an engine.

In one embodiment of the disclosure, an exhaust tract comprises at least one first exhaust gas aftertreatment device and a metering device, e.g. an injector, arranged downstream therefrom. A region of the first exhaust gas aftertreatment device which is situated most downstream in the first exhaust gas aftertreatment device is designed as an SCR region and the metering device is designed in such a way that it can spray a reducing agent onto a downstream-facing side of the first exhaust gas aftertreatment device, counter to a main direction of flow of an exhaust gas. The exhaust tract according to the embodiment can be designed with a second exhaust gas aftertreatment device arranged downstream of the metering device. The exhaust tract according to the embodiment can also comprise a first mixing device arranged in the spraying region of the metering device. This first mixing device influences the distribution of the injected reducing agent over the downstream-facing side of the first exhaust gas aftertreatment device. The exhaust tract according to the embodiment can also be designed with a second mixing device arranged downstream of the metering device. This second mixing device assists mixing of the introduced reducing agent with the exhaust gas. In one example, the first exhaust gas aftertreatment device of the exhaust tract according to the embodiment can comprise an oxidation catalyst. In addition or as an alternative, the first exhaust gas aftertreatment device can also comprise an NOx storage catalyst. The oxidation catalyst or the NOx storage catalyst of the first exhaust gas aftertreatment device or those regions which are designed as such can be connected in a heat-conducting manner to the SCR region of the first exhaust gas aftertreatment device. This promotes rapid warm-up of the SCR region of the first exhaust gas aftertreatment device. The second exhaust gas aftertreatment device of the exhaust tract according to the embodiment can comprise an SCR catalyst. The second exhaust gas aftertreatment device of the exhaust tract according to the embodiment can also comprise a diesel particulate filter or a selectively catalytically coated diesel particulate filter.

The disclosure also comprises a method for operating an exhaust tract according to the embodiment described above and further comprises a vehicle having an internal combustion engine, designed with an exhaust tract according to the embodiment. The method may include purifying an exhaust gas of an internal combustion engine using the exhaust tract according to the embodiment of the disclosure, via a reducing agent that is sprayed onto the downstream-facing side of the first exhaust gas aftertreatment device, counter to a main direction of flow of the exhaust gas, in order to purify the exhaust gas.

A vehicle according to the disclosure is fitted with an exhaust tract according to the embodiment of the disclosure and a control device for carrying out the method according to the embodiment of the disclosure.

Further features, characteristics and advantages of the disclosure will become apparent from the detailed description, given below, of two illustrative embodiments.

FIG. 1 shows an internal combustion engine 14 having a downstream first illustrative embodiment of an exhaust tract including an exhaust aftertreatment system 100 according to the disclosure. In this example, the exhaust tract comprises a first exhaust gas aftertreatment device 8, a metering device 1, an optional first mixing device 2, an optional second mixing device 3, and a second exhaust gas aftertreatment device 9. The internal combustion engine 14 generates an exhaust gas (e.g., exhaust gas flow) 5, which, coming from the internal combustion engine 14, is passed first of all through the first exhaust gas aftertreatment device 8, then through the second exhaust gas aftertreatment device 9 and, finally, to an exhaust gas outlet. This gives the main direction of flow of the exhaust gas 5. Of course, it is also possible for the exhaust gas 5 to be passed through further devices, such as mufflers or further exhaust gas aftertreatment devices. Moreover, branches and/or valves can be arranged in the exhaust flow in order to divert the exhaust gas, e.g. into an exhaust gas recirculation system.

The first exhaust gas aftertreatment device 8 comprises an SCR region 10 including an SCR catalyst arranged downstream in the exhaust gas aftertreatment device 8. Thus, the SCR region 10 may be positioned farther downstream in the exhaust gas aftertreatment device compared to other regions or catalysts of the exhaust gas aftertreatment device 8. Moreover, the first exhaust gas aftertreatment device 8 can comprise a further region, arranged upstream of the SCR region 10, for exhaust gas aftertreatment. In the design of the exhaust tract according to the disclosure illustrated in FIG. 1, this region is designed as an oxidation catalyst 4. Oxidation catalysts 4 are used primarily to fully oxidize the products of incomplete combustion which are present in the exhaust gas, such as CO and HC, with residual oxygen O2 present in the exhaust gas. However, oxidation catalysts 4 also promote the oxidation of NO to NO2, which is advantageous for the operation of SCR catalysts.

The regions within the first exhaust gas aftertreatment device 8 can be regions with a different catalytic coating on a common support structure. The regions are thus connected in a heat-conducting manner. The close-coupled arrangement downstream of the internal combustion engine 14 enables the light-off temperature of the SCR region 10 to be reached quickly after a vehicle fitted with the exhaust tract according to the disclosure is put into operation. In the embodiment shown by way of example in FIG. 1, this is promoted by the exothermic reactions taking place in the oxidation catalyst 4.

The metering device (which, in one example, may be an injector) 1 positioned downstream of the first exhaust gas aftertreatment device 8 is designed in such a way that it can apply a reducing agent 6 to the downstream-facing side 10A of the SCR region 10 counter to a main direction of flow of the exhaust gas 5. For example, a central axis 15 of the metering device 1 is arranged at an obtuse angle from a longitudinal axis 16 of the first exhaust gas aftertreatment device 8, the longitudinal axis 16 arranged along the main direction of flow of the exhaust gas through the exhaust tract and the first exhaust gas aftertreatment device 8. As a result, the central axis 15 intersects the downstream-facing side 10A of the SCR region 10 and reducing agent 6 sprayed from the metering device 1 hits the downstream-facing side 10A of the SCR region. Said another way, a nozzle of the metering device (e.g., injector) 1 faces the downstream-facing side 10A of the SCR region. This enables an SCR reaction to take place in the SCR region 10 situated upstream of the metering device 1, converting nitrogen oxides and the reducing agent 6 or a reaction product of the reducing agent 6 into harmless substances, such as water H2O and nitrogen N2.

In one example, the reducing agent 6 is a urea solution (such as "AdBlue"). This urea solution reacts in the exhaust gas 5 and, especially, in the SCR region 10 to give ammonia ("hydrolysis") and in this way makes possible the SCR reaction. Other reducing agents suitable for an SCR reaction can also be used as a reducing agent 6 instead of the urea solution. Ammonia can be introduced directly into the exhaust gas 5, for example.

A coating of the SCR region 10 can be designed in such a way that it promotes conversion of the reducing agent 6. For example, hydrolysis from urea to ammonia can be promoted. It is thereby possible to assist operation of a second exhaust gas aftertreatment device 9 arranged further downstream. It is also possible for the coating of the SCR region 10 to be designed advantageously to store a substance, e.g. ammonia, so that it is available for a subsequent reaction.

The first mixing device 2 can be arranged in a spraying region of the metering device 1 in order to influence the distribution of the reducing agent 6 and the mixing thereof with the exhaust gas 5. Specifically, the metering device 1 may be coupled to a top surface of a cone-shaped portion 17 of an exhaust passage (e.g., exhaust tract) in which the exhaust aftertreatment device is disposed. A larger diameter, first side of the cone-shaped portion 17 is directly coupled to the SCR region 10 and a smaller diameter, second side of the cone-shaped portion 17 is directly coupled to a pipe 18 of the exhaust passage, the top surface and a bottom surface of the cone-shaped portion 17 coupling the first side to the second side of the cone-shaped portion 17. A first end of the pipe 18 is directly coupled to the second side of the cone-shaped portion 17 and a second end of the pipe 18 is directly coupled to the second exhaust gas aftertreatment device 9.

The second mixing device 3 can be arranged downstream of the metering device 1, in order, for example, to influence the mixing of the reducing agent 6 with the exhaust gas 5 for further treatment in a second exhaust gas aftertreatment device 9 situated further downstream. As shown in FIG. 1, the second mixing device 3 is disposed within the pipe 18.

The second exhaust gas aftertreatment device 9 can be arranged downstream of the metering device 1 and the optional second mixing device 3. In the embodiment shown by way of example in FIG. 1, this is designed as an SCR catalyst 7. Particularly at relatively high loads of the internal combustion engine 14, the temperature and flow rate of the exhaust gas in the SCR region 10 can be so high that some of the NOx cannot be converted in the SCR region 10. In the SCR catalyst 7, nitrogen oxides which are not being converted in the SCR region 10 under relevant boundary conditions can be converted into harmless substances.

For conversion of NOx in the SCR catalyst 7, the necessary conditions include the presence of sufficient reducing agent 6 or reaction products of the reducing agent 6 and a sufficiently high temperature of the SCR catalyst 7. Sufficiently high temperatures in the SCR catalyst 7 can be expected, in particular, at high loads of the internal combustion engine 14. At high loads and correspondingly high temperatures of the exhaust gas 5, it is also easier to introduce large volumes of reducing agent 6 since preliminary reactions, such as evaporation and hydrolysis, are possible.

In the illustrative embodiment of the exhaust tract shown in FIG. 1, there is a particularly advantageous complementarity between the SCR region 10 and the SCR catalyst 7. The SCR region 10 reaches a light-off temperature required for NOx conversion at low engine loads or shortly after engine starting and, given appropriate control of the metering device 1, can reduce NOx emissions. In these operating situations, the SCR catalyst 7 generally does not reach its light-off temperature and therefore can convert only a small amount of NOx or none at all.

At higher engine loads or over a longer time after engine starting, the temperatures in the SCR region 10 increase and can exceed the operating range permissible for NOx conversion. Moreover, higher exhaust gas volume flows can lead to the reducing agent 6 introduced by the metering device 1 no longer reaching or only partially reaching the SCR region 10. It is then no longer possible for the SCR region 10 alone to ensure sufficient NOx conversion. In these operating situations, however, the SCR catalyst 7 can reach its light-off temperature. If enough of the reducing agent 6 is introduced, the SCR catalyst 7 can then convert NOx and thus reduce NOx emissions.

Figure 2:
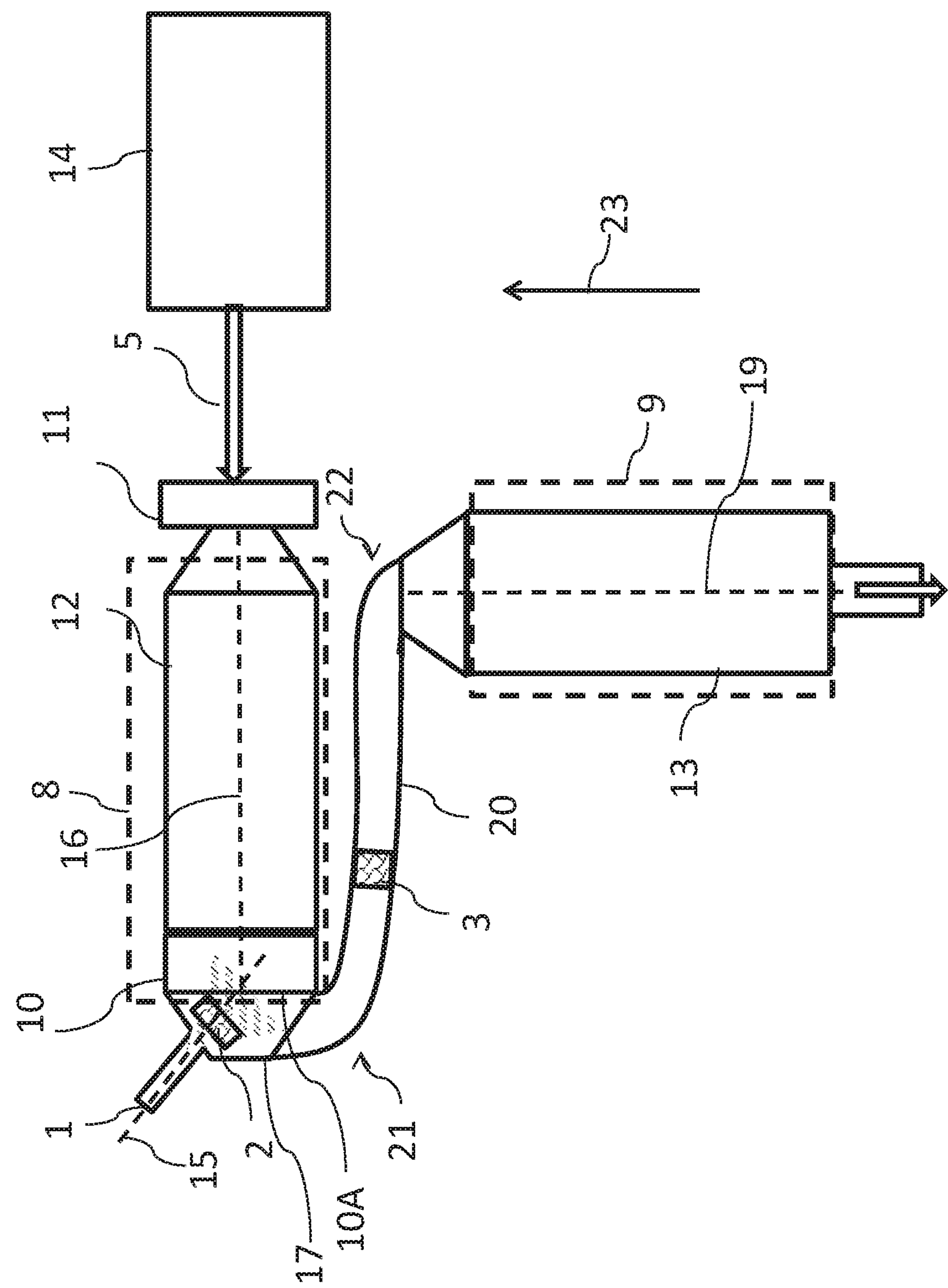
FIG. 2 shows a second illustrative exhaust tract according to an embodiment of the disclosure.

FIG. 2 shows an internal combustion engine 14 having a downstream, second illustrative embodiment of the exhaust tract including an exhaust aftertreatment system 200 according to the disclosure. In the arrangement shown in FIG. 2, an exhaust gas (e.g., exhaust gas flow) 5 produced by the internal combustion engine is first of all passed into an exhaust turbocharger turbine 11, then through a first exhaust aftertreatment device 8 and a second exhaust gas aftertreatment device 9 toward an exhaust gas outlet. The main direction of flow of the exhaust gas 5 into the first exhaust aftertreatment device 8 is parallel to a longitudinal axis 16 of the first exhaust aftertreatment device 8.

The variant of the exhaust tract shown by way of example in FIG. 2 also comprises a metering device 1, an optional first mixing device 2, and an optional second mixing device 3. In this illustrative embodiment too, the exhaust gas 5 can, of course, be passed through further devices, such as mufflers or further exhaust gas aftertreatment devices. Moreover, branches and/or valves can be arranged in the exhaust flow in order to divert exhaust gas for exhaust gas recirculation.

The arrangement of the exhaust turbocharger turbine 11 directly downstream of the internal combustion engine 14 is a commercially available embodiment for current vehicles having an internal combustion engine. In the exhaust turbocharger turbine 11, enthalpy is removed from the exhaust gas 5, generally in order to drive a compressor. However, in alternate embodiment, the exhaust track may not include the exhaust turbocharger turbine 11.

As a departure from the illustrative embodiment shown in FIG. 1, the first exhaust gas aftertreatment device 8 in FIG. 2 comprises a NOx storage catalyst 12 upstream of the SCR region 10. Additionally, the first exhaust gas aftertreatment device 8 includes a common housing (e.g., canister) surrounding (and containing) both the NOx storage catalyst 12 and the SCR region 10. The NOx storage catalyst 12 can store NOx when the temperatures in the first exhaust gas aftertreatment device 8 are still below the light-off temperature of the SCR region 10. Likewise, as a departure from the example shown in FIG. 1, the second exhaust gas aftertreatment device 9 in the variant shown in FIG. 2 is designed as a selectively catalytically coated diesel particulate filter (SDPF) 13.

As shown in FIG. 2, a first longitudinal axis 19 of the SDPF 13 (and the second exhaust gas aftertreatment device 9) is perpendicular to the second longitudinal axis 16 of the first exhaust gas aftertreatment device 8, where the first longitudinal axis 19 is arranged in a direction of exhaust flow through the SDPF 13 and the second longitudinal axis 16 is arranged in the direction of exhaust flow through the first exhaust gas aftertreatment device 8. As such, the direction of exhaust flow through the SDPF 13 is turned 90 degrees from the direction of exhaust flow through the first exhaust gas aftertreatment device 8. The first exhaust gas aftertreatment device 8 and the second exhaust gas aftertreatment device 9 are coupled to one another via a pipe 20 including a U-bend. As shown in FIG. 2, a first end of the pipe 20 includes a first U-bend 21 and a second end of the pipe 20 includes a second bend 22. The geometry of the pipe 20 including the first U-bend 21, a section of relatively straight pipe between the first U-bend 21 and second bend 22, and the second bend 22 enable the change in direction of flow from the first exhaust gas aftertreatment device 8 to the second exhaust gas aftertreatment device 9.

Additionally, the metering device (which, in one example, is an injector) 1 is coupled to a top surface of a cone-shaped portion 17 of an exhaust passage (e.g., exhaust tract) in which the exhaust aftertreatment system is disposed. A larger diameter, first side of the cone-shaped portion 17 is directly coupled to the SCR region 10 and a bottom surface of the cone-shaped portion is directly coupled to the curved pipe 20. The top surface and bottom surface of the cone-shaped portion 17 couple the first side to a smaller diameter, second side of the cone-shaped portion 17. As shown in FIG. 2, the first end of the pipe 20 is directly coupled to the bottom surface of the cone-shaped portion 17 and the second end of the pipe is directly coupled to the SDPF 13. Additionally, as shown in FIG. 2, a first mixing device 2 may be positioned within the cone-shaped portion 17, between the metering device 1 and the downstream-facing side 10A of the SCR region 10. Further, a second mixing device 3 may be disposed in a middle portion of the passage 20, between the first U-bend 21 and the second bend 22.

As shown in FIG. 2, a central axis 15 of the metering device 1 is arranged at an obtuse angle from a longitudinal axis 16 of the first exhaust gas aftertreatment device 8. As a result, the central axis 15 intersects the downstream-facing side 10A of the SCR region 10 and reducing agent 6 sprayed from the metering device 1 hits the downstream-facing side 10A of the SCR region. Due to the above-described arrangement of the metering device 1, cone-shaped portion 17, and pipe 20, the reducing agent 6 sprayed from the metering device 1 also hits the first U-bend 21, where the exhaust flow turns for the first time. Thus, droplets of the reducing agent 6 enter the exhaust gas flow, against the exhaust flow (e.g., in the counter-flow direction), before the exhaust flow starts turning in a different direction (e.g., turning downward, as shown in FIG. 2). The counter-flow injection reduces the likelihood of the reducing agent 6 collecting at the bottom of the U-bend 21. Further, the counter-flow injection of the reducing agent 6 at the angle described above (e.g., obtuse angle relative to longitudinal axis 16) allows for a first portion of reducing agent 6 to enter the upstream SCR of SCR region 10 and a remaining portion of reducing agent 6 to travel downstream to the SDPF 13. The combination of orienting the SDPF 13 perpendicular to and vertically below (relative to vertical direction 23 which is relative to a surface on which a vehicle in which the engine is installed sits) the first exhaust gas aftertreatment device 8, as shown in FIG. 2, and injecting the reducing agent in the counter-flow direction increases turbulence of the exhaust flow and mixing of the reducing agent with the exhaust flow. This arrangement further reduces an overall packaging size of the engine by allowing components of the engine to fit closely together within an engine system.

When a threshold value for the temperature in the NOx storage catalyst 12 is exceeded, the NOx storage catalyst 12 releases stored NOx again. Given a suitable design, the SCR region 10 has reached its light-off temperature at this point in time and can convert the NOx released by the NOx storage catalyst 12. It is also possible for the NOx storage catalyst 12 to be regenerated by "enriched" operation ("substoichiometric" or "with excess fuel") of the internal combustion engine 14. Hydrocarbons HC and carbon monoxide CO from the exhaust gas 5 then react with the nitrogen oxides NOx stored in the NOx storage catalyst 12 to form CO2, N2 and H2O. During enriched engine operation, ammonia can also be formed in the NOx storage catalyst 12, and this can be stored in the SCR region 10 for subsequent NOx conversion.

On the one hand, the SDPF 13 in the illustrative embodiment in FIG. 2 performs a similar function to the SCR catalyst 7 in FIG. 1. If, for example, the temperatures in the SCR region 10 are so high that NOx conversion is inadequate, the temperatures in the SDPF 13 are sufficiently high in the case of a suitable design to ensure adequate conversion of the remaining NOx. As a further function, the SDPF 13 can filter particles out of the exhaust gas 5. Given an appropriate design of the SDPF 13, oxidation of the stored particles and hence regeneration of the SDPF starts at a certain temperature.

The embodiment shown in FIG. 2 thus represents an advantageous system for reducing the NOx emissions of vehicles having internal combustion engines 14 operated with a lean mixture. Depending on the temperature state of the exhaust tract according to the disclosure, either of the NOx storage catalyst 12, the SCR region 10 or the SDPF 13 can reduce NOx emissions. Given appropriate embodiment, therefore, advantageously effective NOx reduction can be provided for any operating state of the vehicle and of the internal combustion engine 14.

A method according to the disclosure for controlling the exhaust tract according to the disclosure determines operating states of the internal combustion engine, such as temperatures of the exhaust gas 5 and of the components of the exhaust tract, using a control device 24 (e.g., electronic control unit including memory and coupled to one or more sensors and/or actuators of the engine). Depending on these, the control device 24 controls the metering device 1 and thus initiates the supply of a suitable volume of the reducing agent 6. Through modulation/variation of control times while simultaneously allowing for the main flow rate of the exhaust gas 5, it is also possible to influence the resulting spray pattern of the metering device 1. Thus, it is possible to influence how the volumes of reducing agent 6 injected are distributed over the SCR region 10 and the second exhaust gas aftertreatment device 9.

A vehicle which comprises an exhaust tract according to the disclosure is also part of the disclosure. In principle, all vehicles having internal combustion engines are suitable here. The disclosure can be applied to particular advantage in vehicles which are fitted with internal combustion engines operated with a lean mixture (with excess air or superstoichiometrically). These are usually trucks or passenger vehicles which are fitted with diesel or direct-injection spark-ignition engines. However embodiment as ships, boats, rail vehicles or motorcycles would also be conceivable.

Figure 3:
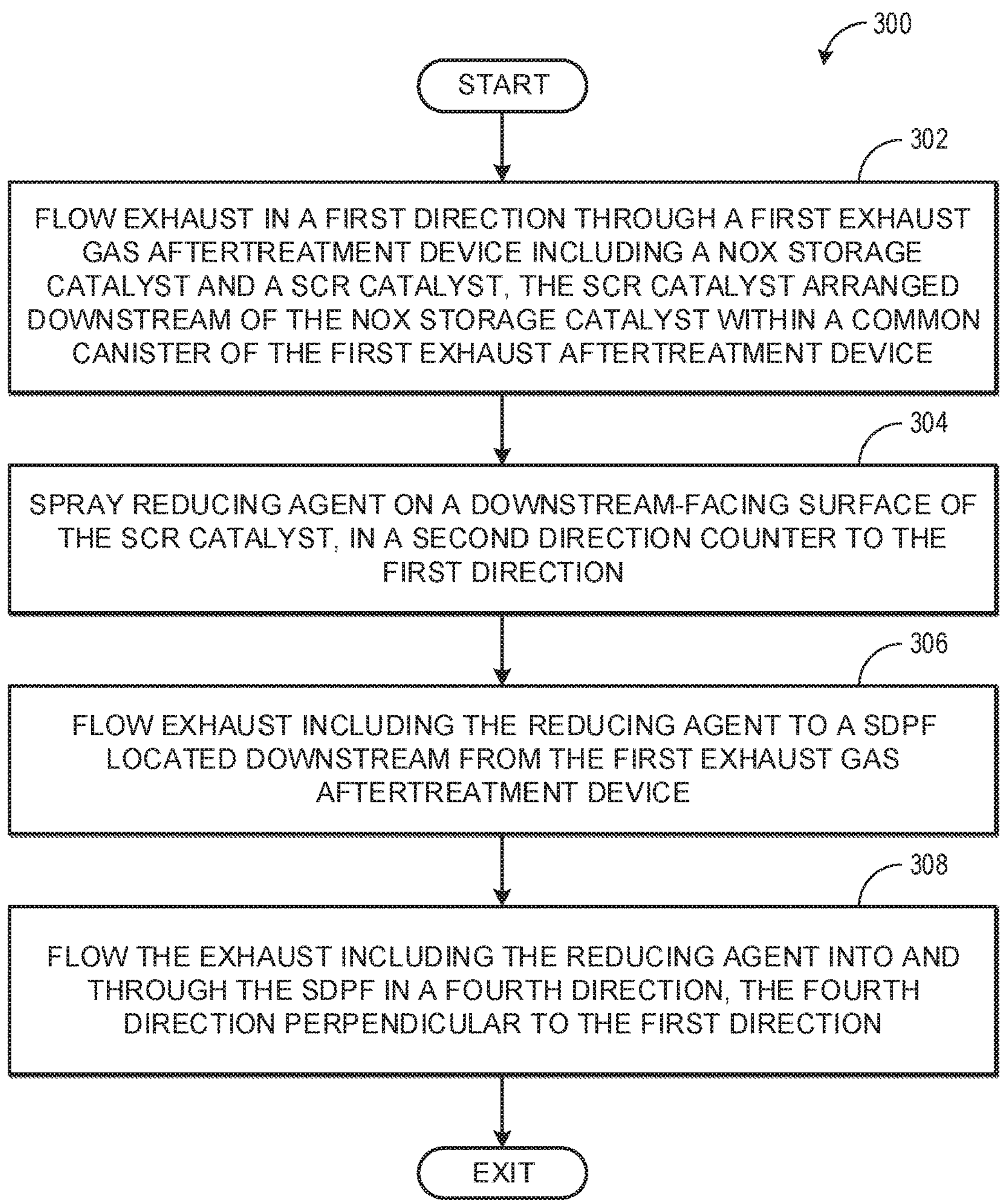
FIG. 3 shows a flow chart of a method for an exhaust gas aftertreatment system according to an embodiment of the disclosure.

FIG. 3 presents a method 300 for an exhaust gas aftertreatment system, such as the exhaust aftertreatment system 200 shown in FIG. 2. At 302, the method includes flowing exhaust in a first direction through a first exhaust gas aftertreatment device including a NOx storage catalyst and a SCR catalyst, the SCR catalyst arranged downstream of the NOx storage catalyst within a common canister of the first exhaust aftertreatment device. At 304, the method includes spraying a reducing agent on a downstream-facing surface of the SCR catalyst, in a second direction counter to the first direction. As one example, counter to the first direction may include in a direction that is arranged at an obtuse angle from the first direction. At 306, the method includes flowing exhaust including the reducing agent to a SDPF located downstream from the first exhaust gas aftertreatment device. As one example, flowing the exhaust including the reducing agent at 304 includes, flowing the exhaust including the reducing agent through a first bend in a pipe coupled between the first exhaust aftertreatment device and the SDPF, then flowing the exhaust including the reducing agent through the pipe in a third direction, the third direction opposite but parallel to the first direction, and then flowing the exhaust including the reducing agent through a second bend in the pipe. At 308, the method includes flowing the exhaust including the reducing agent into and through the SDPF in fourth direction, the fourth direction perpendicular to each of the first direction and the third direction.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust tract for vehicles having an internal combustion engine, comprising:

a first exhaust gas aftertreatment device and a metering device arranged downstream therefrom, where a first region of the first exhaust gas aftertreatment device which is situated downstream in the exhaust tract in a main direction of flow of exhaust gas is designed as an SCR region and the metering device is designed to spray a reducing agent onto a downstream-facing side of the first exhaust gas aftertreatment device, counter to the main direction of flow of the exhaust gas;

wherein the metering device is coupled to an exhaust passage connecting the downstream facing side of the first exhaust gas aftertreatment device and a second exhaust gas aftertreatment device;

wherein the exhaust passage connecting the first exhaust gas aftertreatment device and the second exhaust gas aftertreatment device has a first u-bend and a second bend and a straight portion intermediate the first u-bend and the second bend, the straight portion positioned vertically below the first exhaust gas aftertreatment device with respect to a vertical axis and the second exhaust gas aftertreatment device positioned vertically below the straight portion and the second bend, wherein a first longitudinal axis of the second gas aftertreatment device is parallel with the vertical axis and a longitudinal axis of the first gas aftertreatment device is perpendicular to the vertical axis; and wherein the metering device is an injector wherein a central axis of the injector forms an obtuse angle with the longitudinal axis of the first gas aftertreatment device, the longitudinal axis of the first gas aftertreatment device arranged in the direction of exhaust flow through the first gas aftertreatment device.

2. The exhaust tract as claimed in claim 1, further comprising a first mixing device arranged in a spraying region of the metering device.

3. The exhaust tract as claimed in claim 2, further comprising a second mixing device arranged downstream of the metering device.

4. The exhaust tract as claimed in claim 1, wherein a second region of the first exhaust gas aftertreatment device comprises an oxidation catalyst.

5. The exhaust tract as claimed in claim 1, wherein a second region of the first exhaust gas aftertreatment device comprises a NOx storage catalyst.

6. The exhaust tract as claimed in claim 1, wherein a second region of the first exhaust gas aftertreatment device comprises one of an oxidation catalyst and a NOx storage catalyst and wherein the second region and the SCR region of the first exhaust gas aftertreatment device are connected to one another in a heat-conducting manner.

7. The exhaust tract as claimed in claim 1, wherein the second exhaust gas aftertreatment device comprises one or more of an SCR catalyst, a diesel particulate filter, and a selectively catalytically coated diesel particulate filter.

8. An exhaust aftertreatment system, comprising:

a first device including a NOx storage catalyst and a SCR region, the SCR region disposed downstream of the NOx storage catalyst;

a metering device arranged downstream of the SCR region and adapted to spray a reducing agent on a downstream-facing side of the SCR region, in a direction counter to a direction of exhaust flow through the first device; and a SDPF arranged downstream of the metering device;

wherein the metering device is an injector and wherein a central axis of the injector forms an obtuse angle with a longitudinal axis of the first device, the longitudinal axis arranged in the direction of exhaust flow through the first device;

wherein the metering device is coupled to an exhaust passage connecting the downstream facing side of the first device and an upstream facing side of the SDPF via a pipe with at least one U-bend;

wherein the at least one U-bend curves the pipe vertically below the first device with respect to a vertical axis and the at least one U-bend is coupled to a straight portion parallel to the longitudinal axis of the first device, the longitudinal axis of the first device arranged in the direction of exhaust flow through the first device.

9. The exhaust aftertreatment system of claim 8, wherein the metering device is coupled to a top surface of a cone-shaped portion of the exhaust passage, where a larger diameter, first side of the cone-shaped portion is directly coupled to the SCR region of the first device and a bottom surface of the cone-shaped portion is directly coupled to the pipe of the exhaust passage at an upstream end of the U-bend, the top surface and the bottom surface coupling the first side to a smaller diameter, second side of the cone-shaped portion.

10. The exhaust aftertreatment system of claim 9, wherein a first end of the pipe is directly coupled to the bottom surface of the cone-shaped portion and a second end of the pipe is directly coupled to the SDPF, wherein a first U-bend is located at the first end of the pipe and a second bend is located at the second end of the pipe.

11. The exhaust aftertreatment system of claim 8, wherein the central axis of the injector intersects with the downstream-facing side of the SCR region.

12. The exhaust aftertreatment system of claim 9, further comprising a first mixing device positioned within the cone-shaped portion of the exhaust passage, between the metering device and the downstream-facing side of the SCR region.

13. The exhaust aftertreatment system of claim 8, wherein a first longitudinal axis of the SDPF is perpendicular to a second longitudinal axis of the first device, the first longitudinal axis arranged in a direction of exhaust flow through the SDPF and the second longitudinal axis arranged in the direction of exhaust flow through the first device.

14. The exhaust aftertreatment system of claim 8, wherein the first device includes a common housing surrounding the NOx storage catalyst and the SCR region.

* * * * *